United States Patent
Park et al.

(10) Patent No.: US 8,009,627 B2
(45) Date of Patent: Aug. 30, 2011

(54) METHOD AND SYSTEM FOR PROVIDING INTERWORKING WITH PORTABLE INTERNET NETWORK AND OTHER KINDS OF NETWORKS

(75) Inventors: Seongsoo Park, Seoul (KR); Sangshin Lee, Seoul (KR); Jinsung Cho, Suwon-si (KR); Intae Ryoo, Seoul (KR); Donghahk Lee, Seoul (KR)

(73) Assignee: SK Telecom Co., Ltd. (KR)

( * ) Notice: Subject to any disclaimer, the term of this patent is extended or adjusted under 35 U.S.C. 154(b) by 992 days.

(21) Appl. No.: 11/572,656

(22) PCT Filed: Jul. 27, 2005

(86) PCT No.: PCT/KR2005/002438
§ 371 (c)(1),
(2), (4) Date: Oct. 11, 2007

(87) PCT Pub. No.: WO2006/011753
PCT Pub. Date: Feb. 2, 2006

(65) Prior Publication Data
US 2008/0043699 A1    Feb. 21, 2008

(30) Foreign Application Priority Data
Jul. 27, 2004    (KR) .................. 10-2004-0058894

(51) Int. Cl.
*H04W 4/00*    (2009.01)
(52) U.S. Cl. .......... 370/331; 370/342; 455/432.1; 455/436; 455/456.5; 455/456.6; 455/517

(58) Field of Classification Search ............. 455/432.1, 455/436, 456.5, 456.6, 517, 444, 552.1, 553.1; 370/331, 342
See application file for complete search history.

(56) References Cited

U.S. PATENT DOCUMENTS

| | | | |
|---|---|---|---|
| 6,957,068 B2 * | 10/2005 | Hutchison et al. | 455/435.2 |
| 7,209,462 B2 * | 4/2007 | Sayeedi | 370/335 |
| 2003/0207697 A1 * | 11/2003 | Shpak | 455/524 |
| 2004/0090937 A1 * | 5/2004 | Chaskar et al. | 370/331 |
| 2004/0184436 A1 * | 9/2004 | Abrol et al. | 370/349 |
| 2004/0203780 A1 * | 10/2004 | Julka et al. | 455/436 |
| 2005/0271011 A1 * | 12/2005 | Alemany et al. | 370/331 |
| 2005/0271020 A1 * | 12/2005 | Thermond | 370/338 |

* cited by examiner

*Primary Examiner* — Kamran Afshar
*Assistant Examiner* — Mong-Thuy Tran
(74) *Attorney, Agent, or Firm* — Baker & Hostetler LLP (57) ABSTRACT

Disclosed is a method for acquiring an Access Network Identification (ANID) of a currently connected portable Internet network when a mobile communication terminal connects to the portable Internet network. The method includes the steps of (a) receiving an MAC management message from a base station when the mobile communication terminal connects to the portable Internet network, (b) extracting a base station identification from the MAC management message, and (c) acquiring the ANID for identifying the network to which the mobile communication terminal has connected from the base station identification. According to the method, access network information of a portable Internet network is transferred to a different type of network when the portable Internet network inter-works with said different type of network, so that network information of a portable Internet system can be acquired.

30 Claims, 9 Drawing Sheets

| Type | Message name | Message description | Connection |
|---|---|---|---|
| 0 | UCD | Upling Channel Description | Broad cast |
| 1 | DCD | Downling Channel Description | Broad cast |
| 2 | DL-MAP | Downlink Access Definition | Broad cast |
| 3 | UL-MAP | Upling Accass Definition | Broad cast |
| 4 | RNG-REQ | Ranging Request | Initial Ranging or Basic |
| 5 | RNG-RSP | Ranging Request | Initial Ranging or Basic |
| 6 | REG-REQ | Registration Request | Primary Management |
| 7 | REG-RSP | Registration Response | Primary Management |
| 8 | Reserved | | |
| 9 | PKM-REQ | Privacy Key Management Request | Primary Management |
| 10 | PKM-RSP | Privacy Key Management Response | Primary Management |
| 11 | D&A REQ | Dynamic Service Addition Request | Primary Management |
| 12 | D&A RSP | Dynamic Service Addition Response | Primary Management |
| 13 | D&A ACK | Dynamic Service Addition Acknowledge | Primary Management |
| 14 | D&C REQ | Dynamic Service Change Request | |
| 15 | D&C RSP | Dynamic Service Change Response | Primary Management |
| 16 | D&C ACK | Dynamic Service Change Acknowlege | Primary Management |
| 17 | D&C REQ | Dynamic Service Delection Request | Primary Management |
| 18 | D&C RSP | Dynamic Service Delection Response | Primary Management |
| 19 | | Reserved for future use | |
| 20 | | Reserved for future use | |
| 21 | MCA REQ | Multicast Assignment Request | Basic |
| 22 | MCA-RSP | Multicast Assignment Response | Basic |
| 23 | DBPC-REQ | Downlink Burst Profile Change Request | Basic |
| 24 | DBPC-RSP | Downlink Burst Profile Change Response | Basic |
| 25 | RES-CMD | Reset Command | Basic |
| 26 | SBC-REQ | SS Basic Capability Request | Basic |
| 27 | SBC-RSP | SS Basic Capability Response | Basic |
| 28 | CLK-CMD | SS network clock comparison | Broadcast |
| 29 | DREG-CMD | De/Re-register Control | Basic |
| 30 | DSX-RVD | DSXReceived Message | Primary Management |
| 31 | TFTP-CPLT | Config File TFTP Complete Message | Primary Management |
| 32 | TFTP-RSP | Config File TFTP Complete Response | Primary Management |
| 33 | ARQ-Feedback | Standalone ARQ Feedback | Basic |
| 34 | ARQ-Discard | ARQ Discard message | Basic |
| 35 | ARQ-Reset | ARQ Reset message | Basic |
| 36 | REP-REQ | Channel measurement Report Request | Basic |
| 37 | REP-RSP | Channel measurement Report Response | Basic |
| 38-255 | Reserved | | |

FIG.3

| Syntax | Size | Notes |
|---|---|---|
| DL-MAP_Message_Rormat() { | | |
| Management Message Type=2 | 8 bit | |
| PHY Symoruization Field() { | | |
| Frame Duration Code | 8 bit | |
| Frame Number | 24 bit | |
| Allocation Start Time | 32 bit | |
| } | | |
| DCD Count | 8 bit | |
| Base Satation ID | 48 bit | |
| Number of DL-MAP Elements $n$ | 16 bit | |
| for( $i$ =1; $i$ <= $n$; $i$ ++ ) { | | For each DL-MAP element 1 to $n$ |
| DL_MAP_Information_Element() { | Variable | |
| DIUC | 4 bit | |
| If(DIUC==15) { | | |
| Extended DIUC dependent IE | Variable | |
| } else { | | |
| Number of CID Elements $m$ | 8 bit | Number $m$ of Basic CIDs and/or Broadcast CID configuring the DLB Burst |
| for( $i$ =0, $i$ < $m$ ; $i$ ++ ) { | | |
| CID | 16 bit | 16-bit Basic CID of the SS or Broadcast CID |
| } | | |
| OFDM Symbol Offset | 10 bit | |
| Subchannel Offset | 6 bit | |
| No. OFDM Symbols | 10 bit | |
| No. Subchannels | 6 bit | |
| } | | |
| If!(byte boundary) { | | |
| Padding Nibble | 4 bit | Padding to rech byte boundary |
| } | | |
| } | | |
| } | | |

FIG.4

| 7 | 6 | 5 | 4 | 3 | 2 | 1 | 0 | Octet |
|---|---|---|---|---|---|---|---|---|
| colspan=8 | A13 Element Identifier = [07H] | 1 |
| colspan=8 | Type = 01H | 2 |
| colspan=8 | Length | 3 |
| Reserved | (MSB) | colspan=6 | SID | | | | | 4 |
| colspan=8 | (LSB) | 5 |
| (MSB) | colspan=7 | NID | | | | | | 6 |
| colspan=8 | (LSB) | 7 |
| colspan=8 | PZID | 8 |

FIG.5

| Base Station ID bit | ANID | Use |
|---|---|---|
| 16bits | SID | Provider Identification |
| 16bits | NID | Network Identification |
| 8bits | PZID | Identification Of PCF And ACR (Identify Single Network In Provider) |
| 8bits | ID For Identifying Base Stations | ID For Identifying Base Stations |

| Type | Message name | Message description | Connection |
|---|---|---|---|
| 0 | UCD | Upling Channel Description | Broad cast |
| 1 | DCD | Downling Channel Description | Broad cast |
| 2 | DL-MAP | Downlink Access Definition | Broad cast |
| 3 | UL-MAP | Upling Access Definition | Broad cast |
| 4 | RNG-REQ | Ranging Request | Initial Ranging or Basic |
| 5 | RNG-RSP | Ranging Request | Initial Ranging or Basic |
| 6 | REG-REQ | Registration Request | Primary Management |
| 7 | REG-RSP | Registration Response | Primary Management |
| 8 | Reserved | | |
| 9 | PKM-REQ | Privacy Key Management Request | Primary Management |
| 10 | PKM-RSP | Privacy Key Management Response | Primary Management |
| 11 | D&A REQ | Dynamic Service Addition Request | Primary Management |
| 12 | D&A RSP | Dynamic Service Addition Response | Primary Management |
| 13 | D&A ACK | Dynamic Service Addition Acknowledge | Primary Management |
| 14 | D&C REQ | Dynamic Service Change Request | |
| 15 | D&C RSP | Dynamic Service Change Response | Primary Management |
| 16 | D&C ACK | Dynamic Service Change Acknowlege | Primary Management |
| 17 | D&C REQ | Dynamic Service Delection Request | Primary Management |
| 18 | D&C RSP | Dynamic Service Delection Response | Primary Management |
| 19 | | Reserved for future use | |
| 20 | | Reserved for future use | |
| 21 | MCA REQ | Multicast Assignment Request | Basic |
| 22 | MCA-RSP | Multicast Assignment Response | Basic |
| 23 | DBPC-REQ | Downlink Burst Profile Change Request | Basic |
| 24 | DBPC-RSP | Downlink Burst Profile Change Response | Basic |
| 25 | RES-CMD | Reset Command | Basic |
| 26 | SBC-REQ | SS Basic Capability Request | Basic |
| 27 | SBC-RSP | SS Basic Capability Response | Basic |
| 28 | CLK-CMD | SS network clock comparison | Broadcast |
| 29 | DREG-CMD | De/Re-register Control | Basic |
| 30 | DSX-RVD | DSXReceived Message | Primary Management |
| 31 | TFTP-CPLT | Config File TFTP Complete Message | Primary Management |
| 32 | TFTP-RSP | Config File TFTP Complete Response | Primary Management |
| 33 | ARQ-Feedback | Standalone ARQ Feedback | Basic |
| 34 | ARQ-Discard | ARQ Discard message | Basic |
| 35 | ARQ-Reset | ARQ Reset message | Basic |
| 36 | REP-REQ | Channel measurement Report Request | Basic |
| 37 | REP-RSP | Channel measurement Report Response | Basic |
| 38-255 | Reserved | | |

FIG.8

| Syntax | Size | Notes |
|---|---|---|
| RNG-REQ_Message_Format() { | | |
|   Management Message Type = 4 | 8 bits | |
|   Downlink channel ID | 8 bits | |
|   Pending Until Complete | 8 bits | |
|   TLV Encoded Information { | Variable | TLV Specific |
|     Required Downlink Burst Profile | TLV | Type = 1, Length = 1 Byte, Value = DIUC of the required DLBP |
|     SS MAC Address | TLV | Type = 2, Length = 6 Bytes, Value = SS MAC Address |
|     Ranging Anomalies | TLV | Type = 3, Length = 1, Value = A parameter indicating potential error condition detected by the SS during the ranging process. |
|   } | | |
| } | | |

FIG.9a

| Syntax | Size | Notes |
|---|---|---|
| RNG-REQ_Message_Format() { | | |
|   Management Message Type = 4 | 8 bits | |
|   Downlink channel ID | 8 bits | |
|   Pending Until Complete | 8 bits | |
|   TLV Encoded Information { | Variable | TLV Specific |
|     Required Downlink Burst Profile | TLV | Type = 1, Length = 1 Byte, Value = DIUC of the required DLBP |
|     SS MAC Address | TLV | Type = 2, Length = 6 Bytes, Value = SS MAC Address |
|     Ranging Anomalies | TLV | Type = 3, Length = 1, Value = A parameter indicating potential error condition detected by the SS during the ranging process. |
|     PANID | TLV | Type = 4, Length = 6 Bytes, Value = Previous Access Network ID |
|   } | | |
| } | | |

FIG.9b

| Syntax | Size | Notes |
|---|---|---|
| REG-REQ_Message_Format () { | | |
| Management Message Type = 6 | 8bits | |
| TLV Encoded Information | Variabl | TLV Specific |
| } | | |

FIG.10a

| Syntax | Size | Notes |
|---|---|---|
| REG-REQ_Message_Format () { | | |
| Management Message Type = 6 | 8bits | |
| TLV Encoded Information | Variabl | TLV Specific |
| PANID | 48bits | |
| } | | |

METHOD AND SYSTEM FOR PROVIDING INTERWORKING WITH PORTABLE INTERNET NETWORK AND OTHER KINDS OF NETWORKS

TECHNICAL FIELD

The present invention relates to a method and a system for providing an inter-working between a portable Internet network and a different type of network. More particularly, the present invention relates to a method and a system for providing an inter-working between a portable Internet network and a different type of network by transferring network information of the portable Internet network to an existing network such as a Code Division Multiple Access (Hereinafter, referred to as CDMA) 2000 network having a sufficient infra structure when the existing network inter-works with the portable Internet network.

BACKGROUND ART

With the rapid development of computer, electronic and communication technology, various wireless communication services using a wireless network have been provided. The most basic wireless communication service is a wireless voice communication service for providing voice communication to mobile communication terminal users in wireless manner, which has a characteristic of providing the service to the users regardless of time and place. Further, the wireless communication service supplements a voice communication service by providing a text message service. Recently, a wireless Internet service has emerged, which provides an Internet communication service to mobile communication terminal users through a wireless network.

With the development of mobile communication technology as described above, a service provided by a CDMA mobile communication system is being developed to a multimedia communication service for the transmission of data such as circuit and packet data, including a conventional voice service.

Recently, with the development of information communication, an International Mobile Telecommunication (Hereinafter, referred to as IMT)-2000, e.g., a CDMA 2000 1X, 3X, EV-DO or a Wideband CDMA (WCDMA), has been commercialized, which is the $3^{rd}$ mobile communication system and has been established as a standard by an International Telecommunication Union Recommendation (ITU-R). Further, a wireless Internet service has been provided at a transmission speed of 307.2 Kbps at maximum far faster than 14.4 Kbps or 56 Kbps, which is a data transmission speed supported by an Interim Standard (Hereinafter, referred to as IS)-95A network or an IS-95B network, by means of an IS-95C network evolved from the existing IS-95A network and IS-95B network. In particular, an IMT-2000 service is used, so that the quality of an existing voice and Wireless Application Protocol (WAP) service can be improved and various multimedia services, e.g., Audio On Demand (AOD), Video On Demand (VOD), etc., can be provided at higher speed.

However, because the existing mobile communication system has high base station installation cost, service charges for the wireless Internet are high. Further, because a mobile communication terminal has a small screen, available content is restricted. Therefore, there is a limitation in providing an ultra high-speed wireless Internet service. Furthermore, because Wireless Local Area Network (WLAN) technology shows radio wave interference, narrow service coverage, etc, there is a limitation in providing a public service. Accordingly, a High-speed Portable Internet (Hereinafter, referred to as HPi) system has emerged, which can guarantee portability and mobility and an ultra high-speed wireless Internet service at low cost.

In an HPi system, users access the Internet by means of various portable mobile communication terminals such as notebooks, PDAs and handheld PCs in stationary indoor and outdoor environments and mobile environments involving movement at various speeds, thereby receiving a service including various information and contents. Further, an HPi system provides mobility of 60 km/h, which is an Internet Protocol (IP)-based wireless data system having an upload/download asymmetric transmission characteristic in which a download transmission speed is 24.8 Mbps and an upload transmission speed is 5.2 Mbps.

An HPi system uses a 2.3 GHz frequency band, uses a Time Division Duplex (Hereinafter, referred to as TDD) as a duplex scheme, and uses an Orthogonal Frequency Division Multiple Access (Hereinafter, referred to as OFDMA)/a Time Division Multiple Access (Hereinafter, referred to as TDMA) as a multiple access scheme. Herein, the OFDMA/TDMA is a multiple access scheme similar to a TDMA which allocates all sub-carriers in an entire bandwidth to one user during a predetermined time period and then allocates all sub-carriers to another user during the next predetermined time period.

With the introduction of the new system as described above, an inter-working between an existing network and a new network is required. Because users require various services not restricted to a network type, an inter-working network for meeting the user's requirements has been visually constructed. For the construction of such an inter-working network, research into the 3G mobile communication and the WLAN has been actively pursued. However, these networks have been independently developed and have used different standards. Accordingly, for an inter-working between these networks, it is necessary to consider and update various items such as architectures, protocol structures, mobility, Quality of Service (QoS), authentication, security and accounting.

From the standpoint of a network, a 3G-WLAN inter-working scheme may be classified into a loosely-coupled inter-working scheme and a tightly-coupled inter-working scheme.

According to the loosely-coupled inter-working scheme, a 3G network and a WLAN exist separately and provide independent services, and a gateway for authentication and accounting is additionally provided in order to perform a roaming service requiring an inter-working, etc. Further, the mobility between the 3G network and the WLAN is based on a Mobile IP (MIP).

According to the tightly-coupled inter-working scheme, a WLAN Access Point (AP) connects to a 3G data core network and enables integrated user authentication/accounting and integrated network management to be performed, and it is possible to provide a continuous service, as compared with the MIP-based loosely-coupled inter-working scheme.

Meanwhile, in constructing an inter-working network of an existing network, such as a CDMA 2000 network, and a portable Internet network, because the CDMA 2000 network has already provided a commercial service with a sufficient infra structure, an inter-working scheme requiring the change of the CDMA 2000 network may not be a desirable scheme from the standpoint of a network provider. Accordingly, in constructing the inter-working network of the CDMA 2000 network and the portable Internet network, it is preferred to use a scheme capable of minimizing the change of the network as much as possible.

In this case, the inter-working scheme of the portable Internet network is performed in a manner similar to that of the 3G network and the WLAN. In the CDMA 2000 network, a message for reporting network information including an Access Network ID (Hereinafter, referred to as ANID) for reporting information for a current access network has been basically defined, and a transfer scheme of the message has also been standardized. However, in the portable Internet network, both an acquisition scheme of such an ANID message and a transfer scheme of the ANID message have not been defined. Accordingly, for handoff and roaming, it is necessary to additionally provide a scheme for acquiring the ANID of the portable Internet network and then transferring the acquired ANID.

DISCLOSURE OF THE INVENTION

Therefore, the present invention has been made in view of the above-mentioned problems, and it is an object of the present invention to provide a method and a system for providing an inter-working between a portable Internet network and a different type of network by transferring network information of the portable Internet network to an existing network such as a CDMA 2000 network having a sufficient infra structure when the existing network inter-works with the portable Internet network.

According to one aspect of the present invention, there is provided a method for acquiring an Access Network Identification (ANID) of a currently connected portable Internet network when a mobile communication terminal connects to the portable Internet network, the method comprising the steps of: (a) receiving an MAC management message from a base station when the mobile communication terminal connects to the portable Internet network; (b) extracting a base station identification from the MAC management message; and (c) acquiring the ANID for identifying the network to which the mobile communication terminal has connected from the base station identification.

According to another aspect of the present invention, there is provided a method for providing an inter-working between a portable Internet network and a different type of network, which continues a communication service when a mobile communication terminal having connected to the portable Internet network accesses said different type of network, the method comprising the steps of: (a) receiving a base station identification from a base station when the mobile communication terminal connects to the portable Internet network; (b) acquiring an Access Network Identification (ANID) for identifying the network to which the mobile communication terminal has connected from the base station identification; and (c) transmitting the ANID to said different type of network when the mobile communication terminal moves to said different type of network.

According to further another aspect of the present invention, there is provided a system for providing an inter-working between a portable Internet network and a different type of network, which continues a communication service when a mobile communication terminal having connected to the portable Internet network accesses said different type of network, the system comprising: a base station for transmitting a base station identification to a mobile communication terminal when the mobile communication terminal connects to the portable Internet network; and the mobile communication terminal for acquiring an Access Network Identification (ANID) for identifying the network to which the mobile communication terminal has connected from the base station identification received from the base station, and transmitting the ANID to said different type of network when the mobile communication terminal moves to said different type of network.

According to still another aspect of the present invention, there is provided a mobile communication terminal for providing an inter-working between a portable Internet network and a different type of network, which continues a communication service when the mobile communication terminal having connected to the portable Internet network accesses to said different type of network, wherein the mobile communication terminal receives base station identification from a base station in order to acquire an Access Network Identification (ANID) for identifying the network, to which the mobile communication terminal has connected, from the base station identification when the mobile communication terminal connects to the portable Internet network, and transmits the ANID to said different type of network in order to allow an inter-working between the portable Internet network and said different type of network to be performed when the mobile communication terminal moves to said different type of network.

According to yet another aspect of the present invention, there is provided a method for providing an inter-working between a portable Internet network and a different type of network, which understands said different type of network to which a mobile communication terminal has connected before connection to the portable Internet network when the mobile communication terminal moves and connects to the portable Internet network, thereby continuing a communication service, the method comprising the steps of: (a) when the mobile communication terminal connects to the portable Internet network, receiving a connection message including previous access network information for an access network, to which the mobile communication terminal has connected up to at a time of connection to the portable Internet network, from the mobile communication terminal; (b) selecting a Packet Data Serving Node (PDSN) of the previous access network, the connection of which is to be released, by means of the previous access network information; and (c) releasing connection with the PDSN of the previous access network and maintaining connection with the portable Internet network.

According to yet another aspect of the present invention, there is provided a method for providing by a mobile communication terminal previous access network information for an inter-working between a portable Internet network and a different type of network in order to understand said different type of network, to which the mobile communication terminal has connected before connection to the portable Internet network, when the mobile communication terminal moves and connects to the portable Internet network, and continue a communication service, the method comprising the steps of: (a) when the mobile communication terminal connects to the portable Internet network, determining if a current call is a continuous call with a previous access network to which the mobile communication terminal has connected up to at a time of connection to the portable Internet network; and (b) when the current call is the continuous call with the previous access network, transmitting a connection message including the previous access network information to a base station, thereby allowing an inter-working to be performed.

According to yet another aspect of the present invention, there is provided a system for providing an inter-working between a portable Internet network and a different type of network, which understands said different type of network to which a mobile communication terminal has connected before connection to the portable Internet network when the mobile communication terminal moves and connects to the portable Internet network, thereby continuing a communication service, the system comprising: the mobile communication terminal for determining if a current call is a continuous call with a previous access network to which the mobile communication terminal has connected up to at a time of connection to the portable Internet network when the mobile communication terminal connects to the portable Internet network, and transmitting a connection message including previous access network information when the current call is the continuous call with the previous access network; and an Access Control Router (ACR) for selecting a Packet Data Serving Node (PDSN) of the previous access network, the connection of which is to be released, by means of the previous access network information when the connection message is received from the mobile communication terminal via a base station.

According to yet another aspect of the present invention, there is provided a mobile communication terminal for providing an inter-working between a portable Internet network and a different type of network, which understands said different type of network to which the mobile communication terminal has connected before connection to the portable Internet network when the mobile communication terminal moves and connects to the portable Internet network, thereby continuing a communication service, wherein the mobile communication terminal determines if a current call is a continuous call with a previous access network to which the mobile communication terminal has connected up to at a time of the connection to the portable Internet network when the mobile communication terminal connects to the portable Internet network, and transmits a connection message including previous access network information to a base station when the current call is the continuous call with the previous access network, thereby allowing an inter-working with the previous access network to be performed.

BRIEF DESCRIPTION OF THE DRAWINGS

The foregoing and other objects, features and advantages of the present invention will become more apparent from the following detailed description when taken in conjunction with the accompanying drawings in which:

FIG. 3 is a table illustrating an MAC management message according to a preferred embodiment of the present invention;

FIG. 8 is a table illustrating an MAC management message according to a second preferred embodiment of the present invention;

BEST MODE FOR CARRYING OUT THE INVENTION

Figure 1:
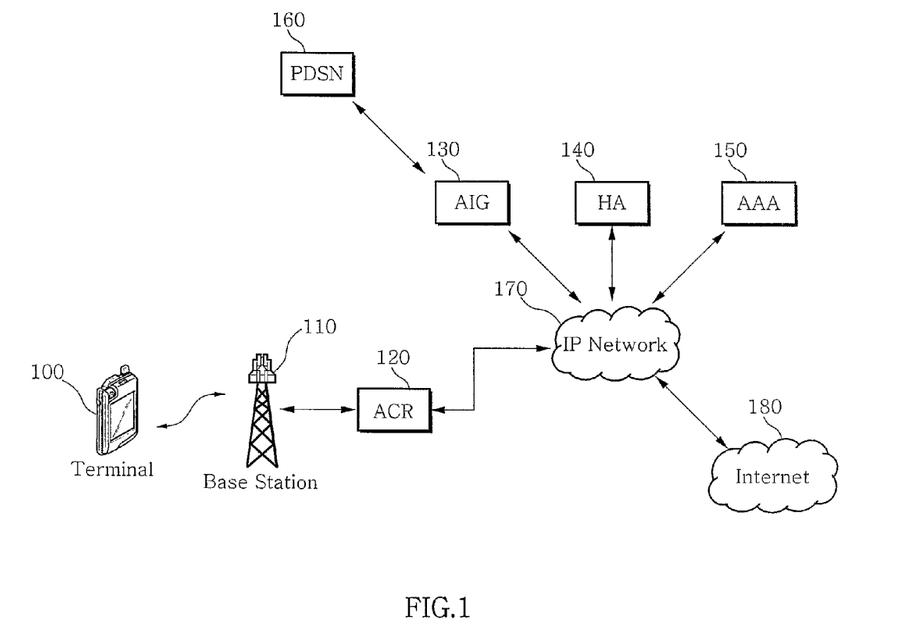
FIG. 1 is a block diagram illustrating the construction of a system for providing an inter-working between a portable Internet network and a different type of network according to a preferred embodiment of the present invention.

Reference will now be made in detail to the preferred embodiment of the present invention. In adding reference numerals to components of each drawing, it is noted that the same reference numerals are used to designate the same components even though the same components are shown in other drawings. In the following description of the present invention, a detailed description of known configurations and functions incorporated herein will be omitted when it may make the subject matter of the present invention rather unclear. FIG. 1 is a block diagram illustrating the construction of a system for providing an inter-working between a portable Internet network and a different type of network according to a preferred embodiment of the present invention.

As illustrated in FIG. 1, the system for providing the inter-working between the portable Internet network and said different type of network according to the preferred embodiment of the present invention may include a mobile communication terminal 100, a Base Station (BS) 110, an Access Control Router (Hereinafter, referred to as ACR) 120, an Access Inter-work Gateway (Hereinafter, referred to as AIG) 130, a Home Agent (Hereinafter, referred to as HA) 140, Authentication, Authorization, Accounting (Hereinafter, referred to as AAA) 150, a Packet Data Serving Node (Hereinafter, referred to as PDSN) 160, an Internet Protocol (Hereinafter, referred to as IP) network 170, the Internet 180, etc.

The present invention proposes the system for providing the inter-working between the portable Internet network and said different type of network, and an inter-working method using the same. Herein, said different type of network includes a Code Division Multiple Access (Hereinafter, referred to as CDMA) 2000 network, a Global System for Mobile (GSM) network, a Wideband-CDMA (W-CDMA) network, etc., but the scope of the present invention is not limited to these networks. For convenience of description and understanding, in the present invention, the CDMA 2000 network is employed as said different type of network for description, but it is apparent to those skilled in the art that the scope of the present invention is not limited to the CDMA 2000 network.

The mobile communication terminal 100 according to the preferred embodiment of the present invention represents a mobile communication terminal for connecting to the portable Internet system according to the preferred embodiment of the present invention, and using an ultra high-speed wireless Internet service. Further, the mobile communication terminal 100 performs a low power Radio Frequency (RF)/Intermediate Frequency (IF) module and controller function, a Media Access Control (Hereinafter, referred to as MAC) frame variable control function according to service characteristics and radio wave conditions, a handoff function, an authentication function, an encryption function, etc.

The mobile communication terminal 100 according to the preferred embodiment of the present invention receives a base station identification (Hereinafter, referred to as ID) from the base station 110 when connecting to the portable Internet network, acquires an Access Network ID (Hereinafter, referred to as ANID) for identifying current networks in connection from the base station ID, and transmits the acquired ANID to said different type of network when moving from the portable Internet network to said different type of network, thereby enabling the inter-working between the portable Internet network and said different type of network to be performed. The moving of the mobile communication terminal 100 from the portable Internet network to said different type of network means the mobile communication terminal 100 must perform handoff or roaming, etc., to said different type of network from the portable Internet network.

That is, in a case where the mobile communication terminal 100 moves from a portable Internet area to a mobile telephone service area supporting a CDMA 2000, etc., and vice versa, the mobile communication terminal 100 requires information for the existing network including the mobile communication terminal 100 when the mobile communication terminal 100 moves while maintaining the existing call. Because a message for the ANID has been basically defined in the CDMA 2000 network, it is possible to understand a network to which a previously connected network has been connected. Accordingly, a processing for the previous network can be performed by the network-side. However, because the ANID has not been defined in the portable Internet network, it is necessary to provide a scheme for transferring the ANID to the mobile communication terminal 100 from the portable Internet network.

For this, the ANID according to the preferred embodiment of the present invention is acquired from the base station ID transmitted from the base station, and is classified into a System ID (Hereinafter, referred to as SID), a Network ID (Hereinafter, referred to as NID), a Packet Zone ID (Hereinafter, referred to as PZID) and base station information before being stored. Otherwise, the ANID is stored in the form from which the SID, the NID, the PZID and base station information may be extracted. This will be described in detail with the base station 110.

Figure 2:
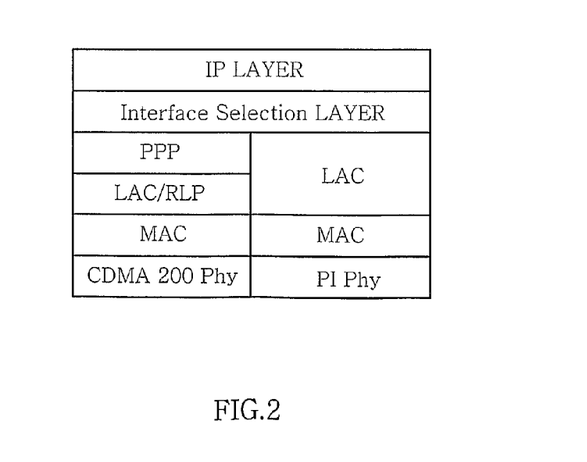
FIG. 2 is a diagram illustrating the protocol stack of a mobile communication terminal according to a preferred embodiment of the present invention.

FIG. 2 shows a protocol stack of the mobile communication terminal 100 for supporting an inter-working of such a portable Internet network. As illustrated in FIG. 2, the mobile communication terminal 100 according to the preferred embodiment of the present invention basically uses a dual stack for a CDMA 2000 service and a portable Internet service. Further, the interface selection layer may perform an optimal wireless access and the IP address is shared for a continuous service performance. Further, the mobile communication terminal 100 according to the preferred embodiment of the present invention understands the existence of the CDMA 2000 network and the portable Internet network by itself, and requests the services.

In the meantime, the mobile communication terminal 100 according to the preferred embodiment of the present invention may include a Personal Digital Assistant (PDA), a cellular phone, a Personal Communication Service (PCS) phone, a hand-held PC, a Global System for Mobile (GSM) phone, a Wideband CDMA (W-CDMA) phone, a CDMA-2000 phone, a Mobile Broadband System (MBS) phone, etc.

The base station 110 according to the preferred embodiment of the present invention performs a low power RF/IF module and controller function, an OFDMA/TDD packet scheduling and channel multiplexing function, an MAC frame variable control function according to service characteristics and radio wave conditions, a 50 Mbps high-speed traffic realtime control function, a handoff function, etc. Further, the base station 110 according to the preferred embodiment of the present invention operates based on the SID, the NID, the PZID, etc.

When the mobile communication terminal 100 according to the preferred embodiment of the present invention connects to the portable Internet network, the base station 110 according to the preferred embodiment of the present invention transmits the base station ID to the mobile communication terminal 100. In order to transmit such a base station ID, the base station 110 uses an MAC management message according to the preferred embodiment of the present invention.

FIG. 3 is a table illustrating an MAC management message according to the preferred embodiment of the present invention.

The MAC management message is a signaling message on a portable Internet traffic channel and includes a set of various MAC management messages defined in order to manage an MAC. Further, all MAC management messages start from type fields and may also include additional fields.

According to the preferred embodiment of the present invention, the base station ID transmitted from the base station 110 is included in a Downlink Access Definition Message (Hereinafter, referred to as DL-MAP) message of type from among these MAC management messages and then transmitted from the base station 110. The DL-MAP message is a message for defining a symbol offset and a sub-channel offset of a burst, and the number of symbols and sub-channels which are allocated resources, etc., the burst being Time Division Multiplexed by the subscriber mobile communication terminal 100 on a downlink. That is, the DL-MAP message is a message for defining access information for downlink information.

Figure 4:
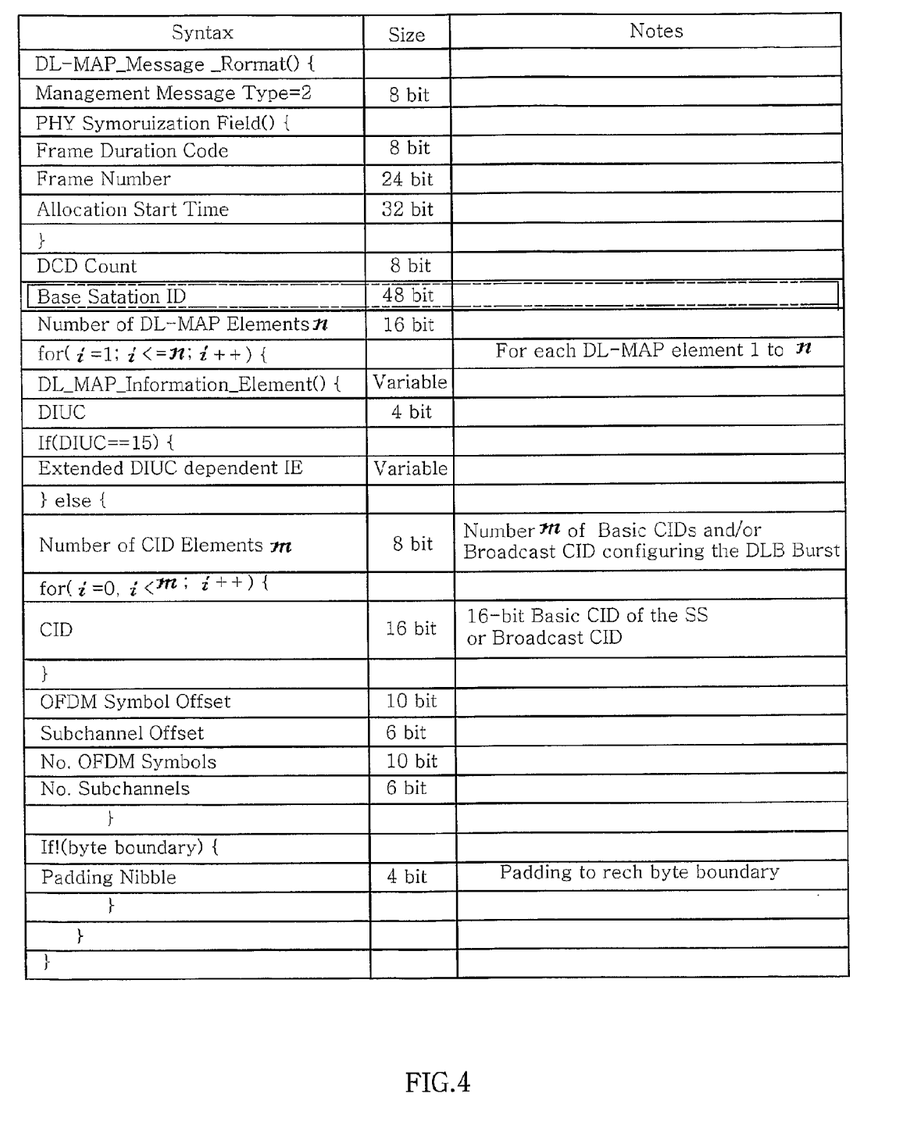
FIG. 4 is a table illustrating the format of a DL-MAP message according to a preferred embodiment of the present invention.

FIG. 4 is a table illustrating the format of the DL-MAP message according to the preferred embodiment of the present invention.

As illustrated in FIG. 4, the DL-MAP message must be generated including PHY synchronization, a DCD count, a base station ID, the number of CID elements and a CID parameter.

From among these parameters, the base station ID is a parameter that can be used as an ANID. Referring to FIG. 4, the base station ID is a field having a length of 48 bits. Because the DL-MAP message of FIG. 4 is received in all terminals, the DL-MAP message can be sufficiently used as an identifier of an access system.

Figure 5:
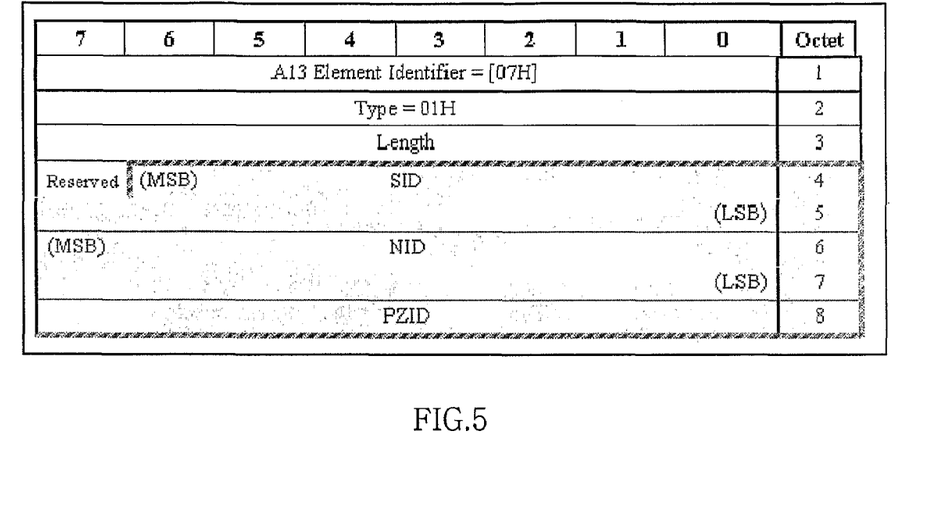
FIG. 5 is a diagram illustrating the structure of an ANID used in a CDMA 2000 network.

FIG. 5 is a diagram illustrating the structure of the ANID used in the CDMA 2000 network. Herein, there is a difference between the length 48 bits of the base station ID to be used in the portable Internet network as illustrated in FIG. 4 and the length 40 bits (exactly, 39 bits) of the ANID used in the CDMA 2000 network as illustrated in FIG. 5. Accordingly, it is necessary to provide a proper method for mapping the length 40 bits of the ANID used in the CDMA 2000 network to the length 48 bits of the base station ID to be used in the portable Internet network.

Figure 6:
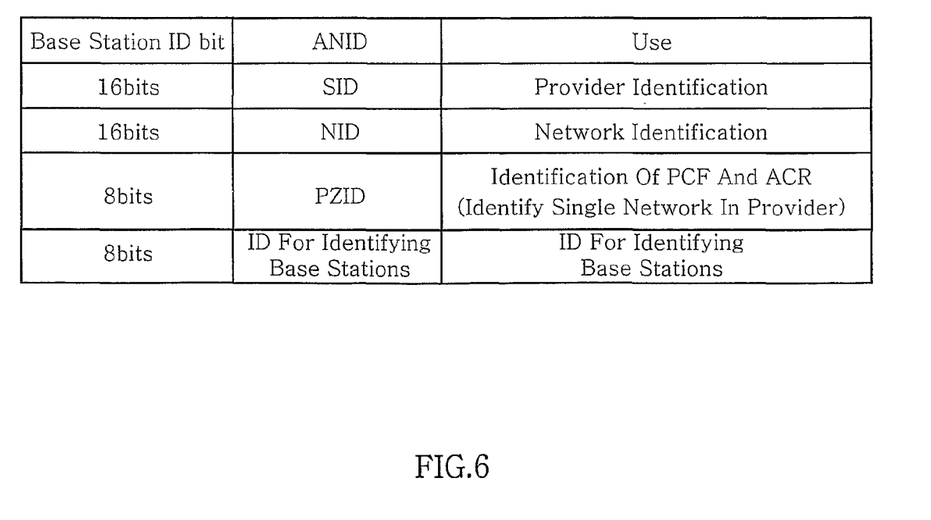
FIG. 6 is a table illustrating an example of a mapping of a base station ID provided in a portable Internet network and an ANID used in a CDMA 2000 network according to a preferred embodiment of the present invention.

FIG. 6 is a table illustrating an example of a mapping of the base station ID provided in the portable Internet network and the ANID used in the CDMA 2000 network according to the preferred embodiment of the present invention.

As illustrated in FIG. 6, because the most significant 32 bits of the base station ID operate as an operation ID, the most significant 32 bits are divided into the SID and the NID of the ANID for processing. Further, the next 8 bits are used for mapping of, the PZID and the other 8 bits are used for identification of portable Internet base stations. Because 256 ($2^8$) portable Internet base stations can be identified in one network, it is possible to identify the sufficient number of base stations. In this way, the ANID of 40 bits and the base station ID of 48 bits are properly mapped, so that the ANID can be acquired from the portable Internet. That is, the mobile communication terminal 100 receives the base station ID of 48 bits from the portable Internet system, uses the upper 40 bits as the ANID, and uses the lower 8 bits as an ID for identifying base stations.

The ACR 120 according to the preferred embodiment of the present invention is an ACR for controlling the plural base stations 110, which performs a handoff control function between the base stations 110, a handoff function between the ACRs 120, a packet routing function, an Internet access function, etc., and connects to the IP network 170.

The AIG 130 according to the preferred embodiment of the present invention performs a point-to-point interface between the PDSN 160 and the ACR 120, and supports a Dynamic Host Configuration Protocol (Hereinafter, referred to as DHCP) server function for an IP address allocation of the mobile communication terminal 100.

The HA 140 according to the preferred embodiment of the present invention performs routing for transmitting packets from an external packet data service server such as the Internet 180. Further, the AAA 150 performs accounting for packet data used by the mobile communication terminal 100 through inter-working with the base station 110, and authenticates an access from the mobile communication terminal 100.

The PDSN 160 according to the preferred embodiment of the present invention performs a previous network identification function for the mobile communication terminal 100, a PPP processing function only for CDMA 2000 calls after distinguishing the CDMA 2000 calls from portable Internet calls, a DHCP server function for performing an IP address allocation for the mobile communication terminal 100, etc.

The IP network 170 according to the preferred embodiment of the present invention supports connection among the base station 110, the ACR 120, the HA 140, the AAA 150, etc., receives packet data from the external packet data service server such as the Internet 180, and transmits the received packet data to the base station 110.

Figure 7:
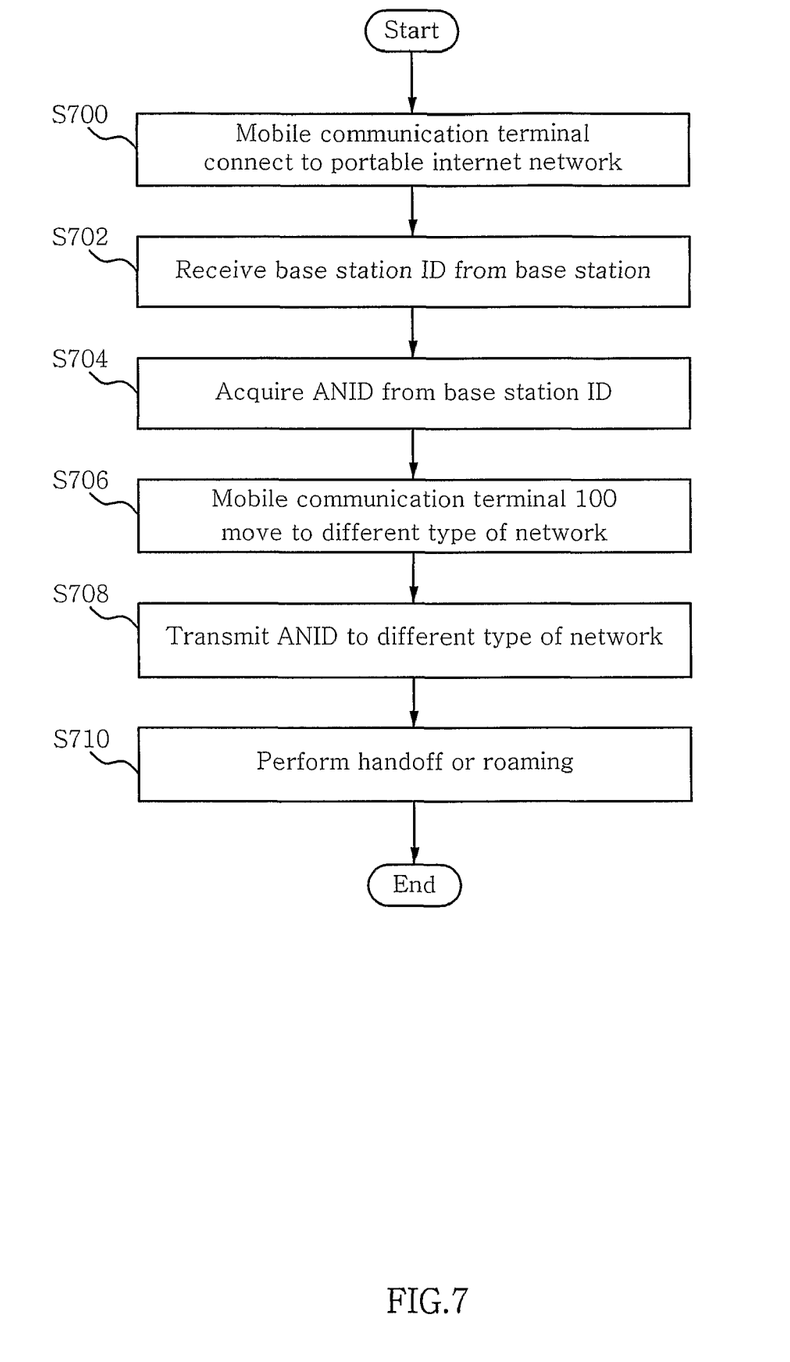
FIG. 7 is a flow diagram illustrating a process for providing an inter-working between a portable Internet network and a different type of network according to a preferred embodiment of the present invention.

FIG. 7 is a flow diagram illustrating a process for providing the inter-working between the portable Internet network and said different type of network according to the preferred embodiment of the present invention.

First, the mobile communication terminal 100 connects to the portable Internet network (S700). When connection to the portable Internet network is successful, the mobile communication terminal 100 receives the base station ID from the base station 110 (S702).

When the base station ID is received from the base station 110, the mobile communication terminal 100 acquires the ANID from the received base station ID (S704). Herein, the mobile communication terminal 100 classifies the received base station ID into the SID, the NID, the PZID, the base station information, and stores the classified IDs.

This is for mapping with the ANID in said different type of network other than the portable Internet network. As described above, when said different type of network is a CDMA 2000 network, the SID, the NID and the PZID are mapped with the ANID of the CDMA 2000 network.

When it is necessary to perform handoff or roaming according to the movement of the mobile communication terminal 100 to said different type of network (S706), the mobile communication terminal 100 transmits the ANID partially or completely extracted from the received base station ID to said different type of network as the ANID of the portable Internet network (S708). Then, said different type of network having received the ANID from the mobile communication terminal 100 performs an inter-working such as handoff or roaming (S710).

According to a second preferred embodiment of the present invention, if the mobile communication terminal 100 connects to the portable Internet network during movement, it is possible to understand said different type of network to which the mobile communication terminal 100 has connected before the connection to the portable Internet network, and continue a communication service.

The mobile communication terminal 100 according to the second preferred embodiment of the present invention determines if the current call is a continuous call with said different type of network when connecting to the portable Internet network. When the current call is the continuous call with said different type of network, the mobile communication terminal 100 transmits a connection message including previous access network information to the base station 110. The continuous call may include a continuous call according to roaming or handoff.

That is, in a case where the mobile communication terminal 100 moves from the portable Internet area to a mobile telephone service area supporting a CDMA 2000, etc., and vice versa, the mobile communication terminal 100 requires information for the existing network including the mobile communication terminal 100 when the mobile communication terminal 100 moves while maintaining the existing call. Because a message for the ANID has been basically defined in the CDMA 2000 network, it is possible to understand a network to which a previously connected network has been connected. Accordingly, a processing for the previous network can be performed by the network-side. However, because the ANID has not been defined in the portable Internet network, it is necessary to provide a scheme for transferring the ANID to the mobile communication terminal 100 from the portable Internet network.

For this, the previous access network information according to the second preferred embodiment of the present invention may include a Previous Access Network ID (PANID), and the connection message transmitted from the mobile communication terminal 100 to the base station 110 may include an MAC management message.

FIG. 8 is a table illustrating an MAC management message according to the second preferred embodiment of the present invention.

The MAC management message is a signaling message on a portable Internet traffic channel and includes a set of various MAC management messages defined in order to manage an MAC. Further, all MAC management messages start from type fields and may also include additional fields.

According to the second preferred embodiment of the present invention, the PANID, which is the previous access network information, is included in a Ranging Request Message (Hereinafter, referred to as RNG-REQ) message of type 4 from among these MAC management messages for transmission. The RNG-REQ message is a message transmitted from the mobile communication terminal 100 in order to determine network delay and request change of power or a downlink burst profile when the mobile communication terminal 100 is initialized or the RNG-REQ message is requested by the base station 110. Further, the RNG-REQ message aims at synchronizing a timing at which all uplinks arrive at the base station 110 after signal transfer delay between the base station 110 and the mobile communication terminal 100 is measured, which is used for power control, checking for the existence of a mobile communication terminal, etc.

Figure 9A:
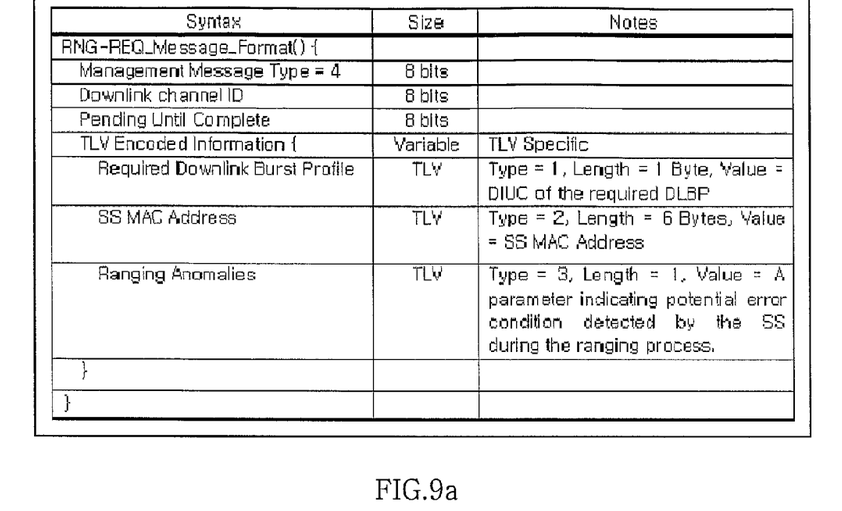
FIG. 9 is a table illustrating the formats of a conventional RNG-REQ message and an RNG-REQ message according to a second preferred embodiment of the present invention.
Figure 9B:
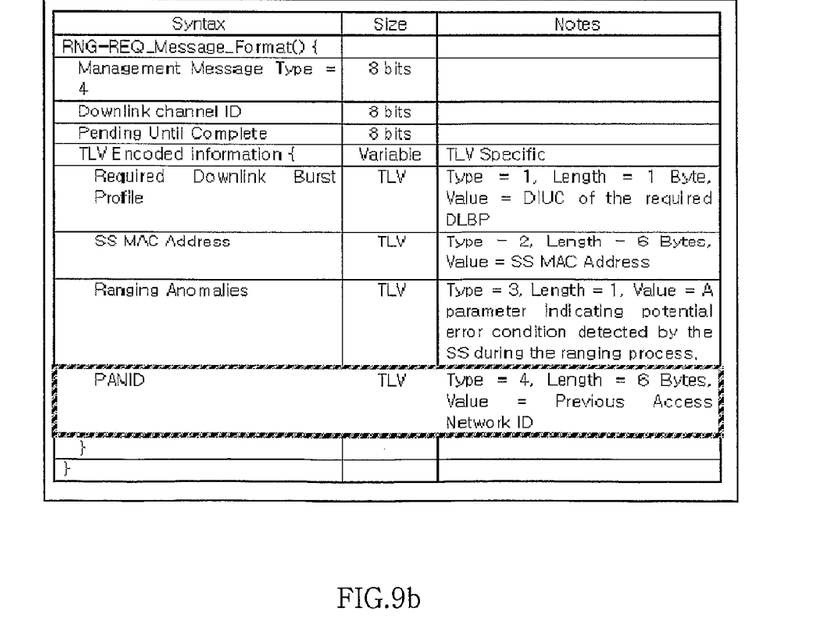

FIG. 9a is a table illustrating the format of a conventional RNG-REQ message, and FIG. 9b is a table illustrating the format of the RNG-REQ message according to the second preferred embodiment of the present invention.

That is, as illustrated in FIG. 9b, it is possible to transfer PANID information of the CDMA 2000 network including a PANID parameter having a length of 48 bits from the mobile communication terminal 100 to the portable Internet network. Herein, it is preferred that the PANID parameter has the length of 48 bits, but the scope of the present invention is not limited to this length.

According to the second preferred embodiment of the present invention, the PANID, which is the previous access network information, is included in a Registration Request Message (Hereinafter, referred to as REG-REQ) message of type 6 from among the MAC management messages for transmission. The REG-REQ message is a message transmitted when the mobile communication terminal 100 attempts a connection to the portable Internet network.

Figure 10A:
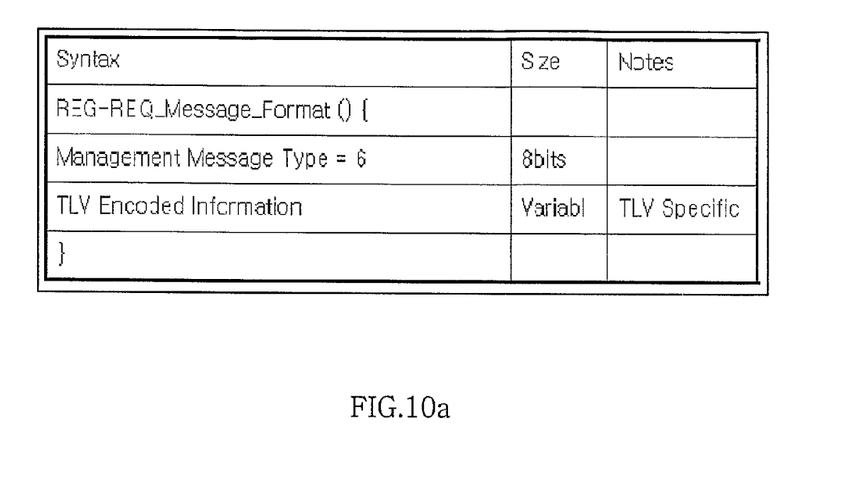
FIG. 10 is a table illustrating the formats of a conventional REG-REQ message and an REG-REQ message according to a second preferred embodiment of the present invention.
Figure 10B:
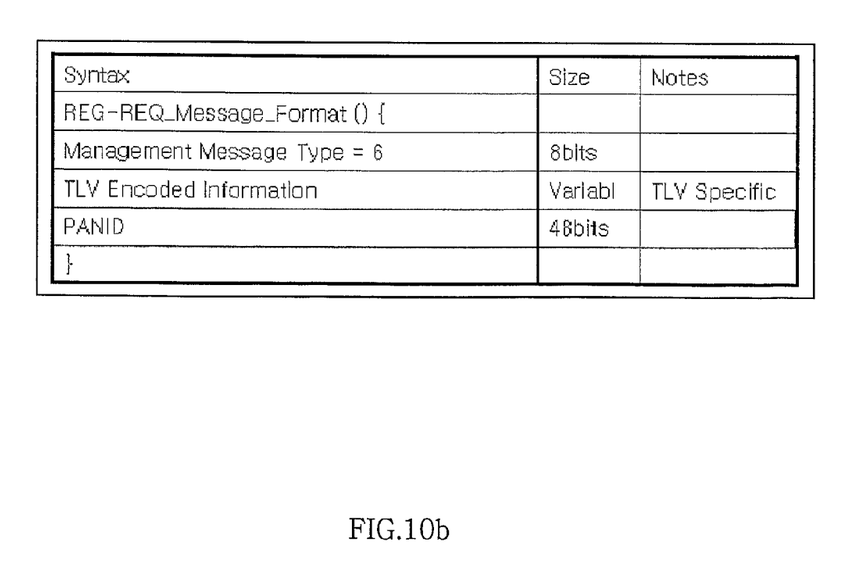

FIG. 10a is a table illustrating the format of a conventional REG-REQ message, and FIG. 10b is a table illustrating the format of the REG-REQ message according to the second preferred embodiment of the present invention.

That is, as illustrated in FIG. 10b, it is possible to transfer PANID information of the CDMA 2000 network including a PANID parameter having a length of 48 bits from the mobile communication terminal 100 to the portable Internet network. Herein, it is preferred that the PANID parameter has the length of 48 bits, but the scope of the present invention is not limited to this length.

The PANID field described in the two embodiments is transmitted from the mobile communication terminal 100 when the mobile communication terminal 100 connects to the portable Internet network from a mobile telephone network such as the CDMA 2000 network or a different type of network. In a case where the mobile communication terminal 100 determines that the current call is not a continuous call with said different type of network when connecting to the portable Internet network, the mobile communication terminal 100 transmits a message not including the PANID field.

When the afore-described connection message is received from the mobile communication terminal 100 via the base station 110, the ACR 120 according to the second preferred embodiment of the present invention selects a PDSN of said different type of network, the connection of which is to be released, by means of the previous access network information included in the connection message.

Figure 11:
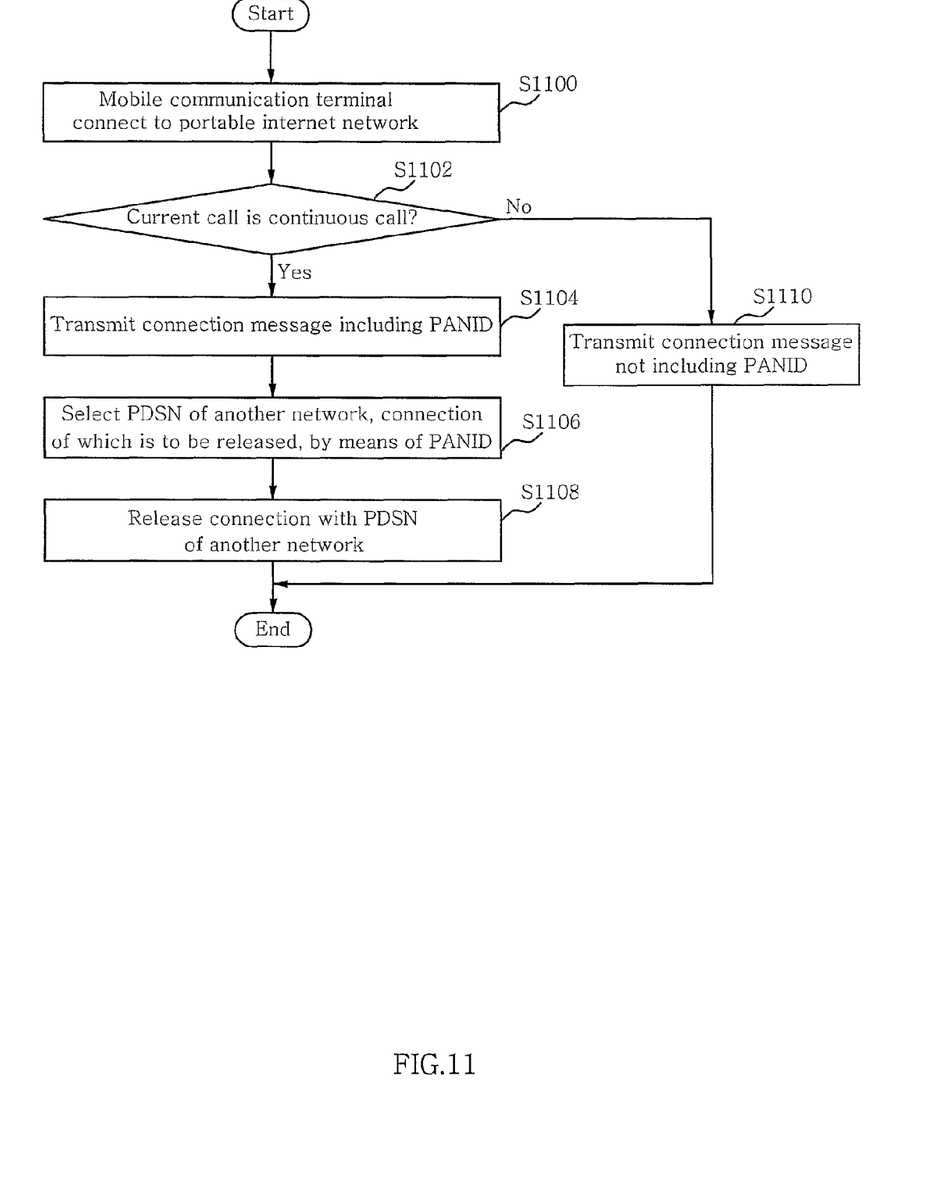
FIG. 11 is a flow diagram illustrating a process for providing an inter-working with a different type of network by a portable Internet network according to a second preferred embodiment of the present invention.

FIG. 11 is a flow diagram illustrating a process for providing an inter-working with said different type of network by the portable Internet network according to the second preferred embodiment of the present invention.

First, the mobile communication terminal 100 connects to the portable Internet network (S1100). The mobile communication terminal 100 determines if the current call is a continuous call with said different type of network, i.e., determines by itself if the current state is a state requiring roaming or handoff (S1102).

As a result of the determination, when the current call is the continuous call with said different type of network, the mobile communication terminal 100 transmits the connection message including the previous access network information to the base station 110 (S1104). Herein, the previous access network information may include the PANID, and the connection message in which the PANID is to be included may include the RNG-REQ message, the REG-REQ message, etc.

Next, the ACR 120 according to the second preferred embodiment of the present invention selects a PDSN of said, different type of network, the connection of which is to be released, by means of the previous access network information included in the connection message received via the base station 110 (S1106), and controls the connection to be released (S1108).

As a result of the determination of step 1102, when the current call is not the continuous call with said different type of network, the mobile communication terminal 100 transmits the connection message not including the previous access network information to the base station 110 (S1110).

The inter-working according to the preferred embodiments of the present invention has a characteristic in which it can be applied without regard to an inter-working scheme type such as a loosely-coupled inter-working scheme, a tightly-coupled inter-working scheme, and a smoothly-coupled inter-working scheme having supplemented these two inter-working schemes, which are described in the 3G-WLAN inter-working scheme.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

INDUSTRIAL APPLICABILITY

As described above, the present invention proposes a scheme for acquiring network information of a portable Internet system by enabling access network information of a portable Internet network to be transferred to a different type of network when the portable Internet network inter-works with said different type of network. Consequently, it is possible to efficiently perform roaming or handoff to a mobile telephone network such as a CDMA 2000 network from the portable Internet network.

Further, according to the present invention, users can receive a roaming service and a handoff service between a mobile phone and a portable Internet, so that satisfaction of the service can be improved. In addition, a service provider can increase sales through the service, create various supplementary services, and increase the profits.

The invention claimed is:

1. A method for providing an inter-working function between a portable Internet system and a different type of system other than the portable Internet system, which provide a continuous communication service in case a mobile communication terminal coupled to the portable Internet system attempts to have access to said different type of system, the method comprising the steps of:

(a) receiving a MAC management message from a base station of the portable Internet system when the mobile communication terminal connects itself to the portable Internet system, wherein the MAC management message defined in the portable Internet system contains a base station identification to which an Access Network Identification (ANID) used in the portable Internet system is mapped as the same length as an ANID used in a different type of system other than the portable Internet system;

(b) extracting the base station identification from the MAC management message;
(c) acquiring the ANID used in the portable Internet system for identifying the network to which the mobile communication terminal is connected, from the base station identification; and
(d) transmitting the ANID used in the portable Internet system to said different type of system when the mobile communication terminal moves to a coverage of said different type of system.

2. The method as claimed in claim 1, wherein the base station identification is included in a DL-MAP message of the MAC management message, the DL-MAP message defining downlink access information.

3. The method as claimed in claim 1, wherein, at step (c), when the mobile communication terminal moves to said different type of system, the mobile communication terminal must perform handoff or roaming to said different type of network.

4. The method as claimed in claim 1, wherein the base station identification has a length of 48 bits or is adapted to the portable Internet system.

5. The method as claimed in claim 1, wherein the base station identification is classified into a System Identification (SID), a Network Identification (NID), a Packet Zone Identification (PZID) and base station information before being stored, or is stored in the form from which the SID, the NID, the PZID and base station information are extracted.

6. The method as claimed in claim 5, wherein the SID, the NID, the PZID and the base station information have lengths of 16 bits, 16 bits, 8 bits and 8 bits, respectively, or are adapted to the portable Internet system.

7. The method as claimed in claim 1, wherein the mobile communication terminal operates a dual stack in order to simultaneously use the portable Internet system and a the different type of system, and shares an IP address for a continuous service performance between the portable Internet system and the different type of system.

8. The method as claimed in claim 1, wherein said different type of system includes a Code Division Multiple Access (CDMA) 2000 system, a Global System for Mobile (GSM) system or a Wideband-CDMA (W-CDMA) network system.

9. An inter-working system for providing an inter-working function between a portable Internet system and a different type of system other than the portable Internet system, which provides a continuous communication service in case a mobile communication terminal coupled to the portable Internet system attempts to have access to said different type of system, the inter-working system comprising:
  a base station of the portable Internet system for transmitting a MAC management message to a mobile communication terminal when the mobile communication terminal connects itself to the portable Internet system, wherein the MAC management message defined in the portable Internet system contains a base station identification to which an Access Network Identification (ANID) used in the portable Internet system is mapped as the same length as an ANID used in said different type of system; and
  wherein the mobile communication terminal is used for acquiring the ANID from the portable Internet system for identifying the network to which the mobile communication terminal is connected from the base station identification received from the base station, and for transmitting the ANID used in the portable Internet system to said different type of system when the mobile communication terminal moves to a coverage of said different type of system.

10. The system as claimed in claim 9, wherein the base station identification is included in a DL-MAP message of the MAC management message, the DL-MAP message defining downlink access information.

11. The system as claimed in claim 9, wherein, when the mobile communication terminal moves to said different type of system, the mobile communication terminal must perform handoff or roaming to said different type of system from the portable Internet system.

12. The system as claimed in claim 9, wherein the base station identification has a length of 48 bits or is adapted to the portable Internet system.

13. The system as claimed in claim 9, wherein the base station identification is classified into a System Identification (SID), a Network Identification (NID), a Packet Zone Identification (PZID) and base station information before being stored, or is stored in the form from which the SID, the NID, the PZID and base station information are extracted.

14. The system as claimed in claim 13, wherein the SID, the NID, the PZID and the base station information have lengths of 16 bits, 16 bits, 8 bits and 8 bits, respectively, or are adapted to the portable Internet system.

15. The system as claimed in claim 9, wherein the mobile communication terminal operates a dual stack in order to make simultaneous use of the portable Internet system and said different type of system, and shares an IP address for a continuous service performance between the portable Internet system and said different type of system.

16. The system as claimed in claim 9, wherein said different type of system includes a Code Division Multiple Access (CDMA) 2000 system, a Global System for Mobile (GSM) system or a Wideband-CDMA (W-CDMA) system.

17. The system as claimed in claim 9, wherein the mobile communication terminal includes at least one of a Personal Digital Assistant (PDA), a cellular phone, a Personal Communication Service (PCS) phone, a hand-held PC, a Global System for Mobile (GSM) phone, a Wideband CDMA (W-CDMA) phone, a CDMA-2000 phone, a Mobile Broadband System (MBS) phone.

18. A mobile communication terminal for providing an inter-working function between a portable Internet system and a different type of system other than the portable Internet system, which provides a continuous communication service in case the mobile communication terminal coupled to the portable Internet system attempts to have access to said different type of system,
  wherein the mobile communication terminal receives an MAC management message from a base station of the portable Internet system, wherein the MAC management message defined in the portable Internet system contains a base station identification to which an Access Network Identification (ANID) used in the portable Internet system is mapped as the same length as an ANID used in said different type of system, and acquires the ANID used in the portable Internet system for identifying the network to which the mobile communication terminal is connected, from the base station identification when the mobile communication terminal connects itself to the portable Internet system, and transmits the ANID used in the portable Internet system to said different type of system in order to allow the inter-working function between the portable Internet system and said different type of system to be performed when the mobile communication terminal moves to a coverage of said different type of system.

19. The mobile communication terminal as claimed in claim 18, wherein the base station identification is included in a DL-MAP message of the MAC management message, the DL-MAP message defining downlink access information.

20. The mobile communication terminal as claimed in claim 18, wherein, when the mobile communication terminal moves to the coverage of said different type of system, the mobile communication terminal must perform handoff or roaming to said different type of system from the portable Internet system.

21. The mobile communication terminal as claimed in claim 18, wherein the base station identification has a length of 48 bits or is adapted to the portable Internet system.

22. The mobile communication terminal as claimed in claim 18, wherein the base station identification is classified into a System Identification (SID), a Network Identification (NID), a Packet Zone Identification (PZID) and base station information before being stored, or is stored in the form from which the SID, the NID, the PZID and base station information are extracted.

23. The mobile communication terminal as claimed in claim 22, wherein the SID, the NID, the PZID and the base station information have lengths of 16 bits, 16 bits, 8 bits and 8 bits, respectively, or are adapted to the portable Internet system.

24. The mobile communication terminal as claimed in claim 18, wherein the mobile communication terminal operates a dual stack in order to simultaneously use the portable Internet system and a different type of system, and shares an IP address for a continuous service performance between the portable Internet system and said different type of system.

25. The mobile communication terminal as claimed in claim 18, wherein said different type of system includes a Code Division Multiple Access (CDMA) 2000 system, a Global System for Mobile (GSM) system or a Wideband-CDMA (W-CDMA) system.

26. The mobile communication terminal as claimed in claim 18, wherein the mobile communication terminal includes at least one of a Personal Digital Assistant (PDA), a cellular phone, a Personal Communication Service (PCS) phone, a hand-held PC, a Global System for Mobile (GSM) phone, a Wideband CDMA (W-CDMA) phone, a CDMA-2000 phone, a Mobile Broadband System (MBS) phone.

27. A method for providing an inter-working function between a portable Internet system and a different type of system other than the portable Internet system, which perceives said different type of system to which a mobile communication terminal has been connected as of its connection to the portable Internet system when the mobile communication terminal connects to the portable Internet system, thereby providing a continuous communication service, the method comprising the steps of:
  (a) when the mobile communication terminal connects itself to the portable Internet system, receiving an MAC management message from the mobile communication terminal;
  (b) determining whether or not the MAC management message includes previous access network identification (PANID) for an access network of said different type of system to which the mobile communication terminal has been connected as of connection to the portable Internet system, wherein the PANID is mapped to the length of a base station identification used in the portable Internet system;
  (c) extracting PANID from MAC management message based on the determination;
  (d) selecting a Packet Data Serving Node (PDSN) of the previous access network, the connection of which is to be released, by means of the PANID; and
  (e) releasing connection with the PDSN of the previous access network and maintaining connection with the portable Internet system.

28. A method for providing previous access network information for an inter-working between a portable Internet system and a different type of system other than the portable Internet system in order to perceive said different type of system, to which the mobile communication terminal has been connected as of its connection to the portable Internet system, in case the mobile communication terminal moves and connects itself to the portable Internet system, and provide a continuous communication service, the method comprising the steps of:
  (a) when the mobile communication terminal connects to the portable Internet system, determining if a current call is a continuous call with a previous access network of said different type of system to which the mobile communication terminal has been connected as of its connection to the portable Internet system; and
  (b) if the current call is the continuous call with the previous access network, transmitting an MAC management message including the previous access network identification (PANID) to a base station of the portable Internet system, wherein the PANID is mapped to the length of a base station identification used in the portable Internet system, and if not transmitting a connection message not including the PANID to the base station, thereby allowing an inter-working to be performed.

29. A system for providing an inter-working function between a portable Internet system and a different type of system other than the portable Internet system, by perceiving said different type of system to which a mobile communication terminal has been connected as of its connection to the portable Internet system when the mobile communication terminal moves and connects itself to the portable Internet system, to thereby provide a continuous communication service, the system comprising:
  the mobile communication terminal for determining if a current call is a continuous call with a previous access network of said different type of system to which the mobile communication terminal has been connected as of its connection to the portable Internet system when the mobile communication terminal connects itself to the portable Internet system, and transmitting an MAC management message including previous access network identification (PANID) when the current call is the continuous call with the previous access network, wherein the PANID is mapped to the length of a base station identification used in the portable Internet system; and
  an Access Control Router (ACR) of the portable Internet system for determining whether or not the MAC management message includes the PANID, extracting the PANID from the MAC management message based on the determination, and selecting a Packet Data Serving Node (PDSN) of the previous access network, the connection of which is to be released, by using the PANID, when the MAC management message is received from the mobile communication terminal via a base station of the portable Internet system.

30. A mobile communication terminal for providing an inter-working function between a portable Internet system and a different type of system other than the portable Internet system, by perceiving said different type of system to which the mobile communication terminal has been connected as of its connection to the portable Internet system when the mobile communication terminal moves and connects itself to the portable Internet system, to thereby provide a continuous communication service,     wherein the mobile communication terminal determines whether a current call is a continuous call with a previous access network of said different type of system to which the mobile communication terminal has been connected as of its the connection to the portable Internet system when the mobile communication terminal connects itself to the portable Internet system, and transmits an MAC management message including previous access network identification (PANID) to a base station of the portable Internet system if the current call is the continuous call with the previous access network, wherein the PANID is mapped to the length of a base station identification used in the portable Internet system, and transmits an MAC management message not including the PANID to a base station if the current call is not the continuous call with the previous access network, thereby allowing an inter-working with the previous access network to be performed.

\* \* \* \* \*